United States Patent Office 3,187,848
Patented June 8, 1965

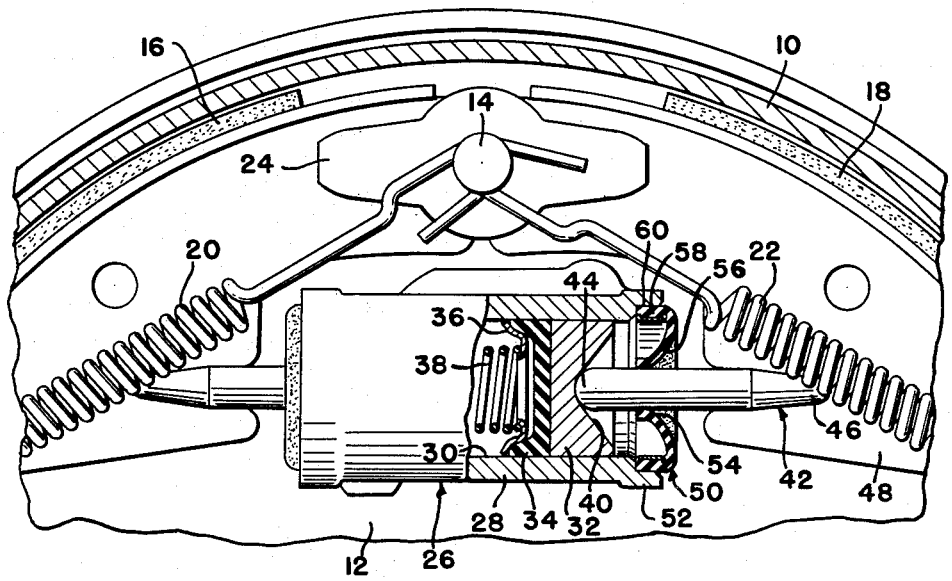

3,187,848
WHEEL CYLINDER SEAL ASSEMBLY
Ronald L. Shellhause, Vandalia, and Carl A. Bierlein,
Kettering, Ohio, assignors to General Motors Corporation, Detroit, Mich., a corporation of Delaware
Filed Nov. 19, 1962, Ser. No. 238,503
8 Claims. (Cl. 188—152)

The invention relates to a wheel cylinder assembly in a wheel brake, and more particularly to the wheel cylinder boot construction and the method utilized in assembling the boot to the wheel cylinder. The invention also relates to the wheel cylinder assembly wherein the wheel cylinder boot is received internally of the end of the wheel cylinder and is held therein by friction and cohesive forces and mechanical locking engagement obtained by flowing the wheel cylinder boot material into the engaged surface of the wheel cylinder. A wheel cylinder assembly having this construction is advantageous in that it virtually eliminates damage to the wheel cylinder boot during various handling operations prior to being assembled in a wheel brake, and provides for better radiant heat dissipation while the brakes are operating. Assemblies embodying the invention also provide better wheel cylinder boot retention characteristics which increase within a few hours after installation and further increase after a short period of use under normal operating conditions. The boot retention and link pin sealing characteristics are such that the boot link pin sealing section flips outwardly should an abnormal gas or fluid buildup occur behind the boot and within the wheel cylinder. This flipping action functions as a safety valve which will allow only a small fluid loss rather than a complete fluid loss should the entire boot be forced away from the wheel cylinder. The sealing section will continue to have a sealing action in the flipped condition. The internal position of the wheel cylinder boot also permits better heat disispation characteristics by exposing the entire outer surface of the wheel cylinder to radiant heat being radiated from the brake shoes during the braking operation instead of having the wheel cylinder boot covering the cylinder end and thereby acting as a radiant heat insulator in this area and at the same time absorbing more heat than it does when inside the cylinder.

In the drawing:
FIGURE 1 is a view of a portion of a wheel brake assembly embodying the invention and having parts broken away and in section.
FIGURE 2 is a perspective view of a wheel cylinder and boot in position just prior to installation of the boot in the cylinder, with parts broken away and in section.
FIGURE 3 is an enlarged partial view having parts broken away and in section and showing somewhat schematically the wheel cylinder boot as retained in the end of the wheel cylinder.

The wheel brake assembly may be of any suitable type and is illustrated in this instance as one of the duo-servo type. It includes a drum 10 which is rotatable and to which the wheel is attached. A backing plate 12 is suitably attached to the vehicle. An anchor pin 14 is secured to the backing plate to receive and transmit the braking forces from the shoes 16 and 18 to the vehicle through the backing plate. Shoes 16 and 18 are movably mounted on the backing plate in the usual manner so that they are movable into and out of braking engagement with the drum 10. Suitable retractor springs 20 and 22 are secured to the anchor pin 14 in the usual manner so that they perform their usual functions, including retention of the guide plate 24 in place on the anchor pin.

The wheel cylinder assembly 26 is secured to the backing plate 12 in force-transmitting and heat conducting relationship in any suitable manner. The particular wheel cylinder assembly illustrated includes a cylinder body 28 in which a cylinder bore 30 is formed. Bore 30 is smooth finished by suitable operations such as honing, as is well known to those skilled in the art. Only one half of the interior of the wheel cylinder assembly 26 is illustrated in section since the other end of the assembly is substantially identical thereto but in reverse relation. The invention is also applicable to wheel cylinders of other constructions than those required for duo-servo brakes.

A piston 32 is operably received in the bore 30 and a cup seal 34 engages the inner surface of the piston and is retained in position against the piston by spring seat 36 and spring 38. Piston 32 is suitably recessed as at 40 to receive link pin 42 so that the link pin end 44 remains substantially on the center line of the wheel cylinder. Link pin 42 extends out of the wheel cylinder so that its other end 46 engages the web 48 of shoe 18 in force-transmitting relation. This portion of the structure is conventional except for the ends of the cylinder body 28, one of which is described below with regard to the wheel cylinder boot.

The wheel cylinder boot 50 is inserted in the end 52 of the cylinder body 28 and is provided with an annular inner seal section 54 which is in sealing engagement with the link pin 42. Boot 50 is preferably constructed somewhat like half of a hollow torus so that the intermediate body section 56 extends from the inner seal section 54 first axially in one direction relative to the axis of the cylinder body and then curves as the radius increases until it extends axially in the other direction adjacent the outer peripheral section 58 of the boot. The outer peripheral section 58 is preferably radially outward of the inner seal section 54 and is formed as an annular cylindrical section having an outer surface 60, an inner surface 62 and an end surface 64. The wheel cylinder boot is made of any suitable flexible material such as rubber, neoprene, styrene butadiene, or any elastomeric material having similar characteristics. Any material used must not be adversely affected by the hydraulic brake fluid utilized. It must also be able to withstand temperatures in the area of 300° F. to 450° F. without melting, cracking or otherwise failing. It must be sufficiently flexible to permit the inner seal section 54 to move with pivotal movement of link pin 42 and to flip outwardly under excess pressure within the wheel cylinder body exteriorly of piston 32 without being permanently damaged. It must also be sufficiently strong to resist this flipping action until such excess pressures are obtained. This, of course, is a function of the physical proportions of the boot, taking into consideration the other physical characteristics of the material utilized.

The boot 50 is preferably provided with a retainer ring 66 which can be bonded to the inner surface 62, or may otherwise be secured thereto. If desired the inner surface 62 may be the bottom of a shallow recess which has approximately the thickness of the retainer ring 66 so that the retainer ring is positioned against a boot shoulder 68 and its edge 70 is substantially in alignment with the end surface 64 of the boot.

The recess 72 formed in the end 52 of the wheel cylinder preferably has a greater diameter than the bore 30 so that a shoulder 74 is provided. The surface 76, which is the bottom of the recess 72, has a controlled finish which is provided with a predetermined roughness. Where the finish of bore 30 is honed to approximately a 15 micro-inches R.M.S. finish, surface 76 is finished so that it has a 60 to 120 micro-inches R.M.S.

finish. This range is given here as indicative of the roughness but is not so critical that the roughness must be maintained within these exact limits. It has been found, however, that these limits yield satisfactory results without requiring the close control in the finish operation which is required in finish bore 30. The illustration in FIGURE 3 indicating the roughness of this surface is for illustrative purposes only and is not indicative of the precise roughness desired.

The wheel cylinder boot 50 is installed in the recess 72 by pressing it axially inward. A lubricant such as diacetone alcohol or a glycol ether such as commercially available brake fluid may be used. The lubricant must assist in the installation without being so slippery that the immediate friction and cohesive interaction of the wheel cylinder body and the boot is insufficient to resist the outward force exerted on the boot by spring 38 through cup 36 and piston 32. Also, the lubricant must be compatible with the material of which the boot is made. Since the boot outer cylindrical surface 60 is preferably provided with a diameter so that it is a slight interference fit in recess 72, the material of which the boot is made is slightly compressed upon installation. The boot is pressed axially into the recess 72, and by way of example, in a ⅞" wheel cylinder the installation force has been found to be from 10 to 20 pounds. The boot is held in place by frictional engagement of its surface 60 with the controlled finish surface 76 immediately upon installation, and this frictional engagement dependent to some extent on the force exerted radially outward due to the interference fit. These forces are augmented by the relative stiffness of the retainer ring 66 which resists radial collapse of the wheel boot and therefore exerts a reaction force radially outward against the wheel cylinder body tending to compress the boot section 58. It has been found that immediate removal of the boot 50 after such installation can be accomplished by exerting a removal force axially against the retainer ring 66 which is approximately half of the installation force. Thus at this time the removal force is only required to overcome the frictional force plus a slight cohesive action. However, if the boot is permitted to set for a time without further work being done on or by the assembly, a removal force approximately equal to the installation force is required. This has been found to be caused by the flow of the material of which the boot is made at and near surface 60 into the controlled roughness surface 76 so that these surfaces are mechanically locked. This is illustrated in FIGURE 3 in a non-scale presentation. This flow condition can be accelerated appreciably by exerting radial forces against the retainer ring 66 so as to cause the surface 60 of the boot to flow more quickly into complementary engagement with the controlled finish surface 76. This may also be accomplished by using the wheel cylinder at normal brake operating temperatures for a short period of time. It has been found for example that after such usage the removal force required is approximately double or triple the installation force. It is believed that this occurs due in part to a cohesive reaction between the cylinder and the boot. It may also be due in part to some pressures being exerted internally of the wheel cylinder boot in the chamber 78 formed by the boot, the piston 32, the link pin 42, and the cylinder body 28. These pressures are obtained by normal movement of the piston 32 in the bore 30 which alternately decreases and increases the volume of chamber 78. The heating of the wheel cylinder boot under operating conditions, as well as the heating of the cylinder body, also contributes to the full mechanical lock condition of the boot. Heat at or below the normal operating temperature of the boot, and therefore above ambient temperatures can therefore be used to accelerate the mechanical lock condition, or in conjunction with the radially outward forces noted above, or independently of them. It is well known that elastomer material such as those of which boots may be made suffer a compression set when compressed for long periods of time. This set in the section 58 of the boot does not decrease the removal forces required after some months, for example. It is thought that this set is counteracted by the effectiveness of the cohesive and mechanical lock of the surfaces 60 and 76.

It has been found that at times the shoe web temperatures will be as high as 850° F. for short periods when the brakes are temporarily overloaded. The heat is radiated from the drum and the shoes to the backing plate, the wheel cylinder, the reactor springs, and any other elements exposed to them in radiant heat relation. In previous commonly used wheel cylinder constructions the wheel cylinder boots were made sufficiently large to be fitted tightly over the outside of the wheel cylinder ends. This construction is typical of all current production brakes of the duo-servo type. In this construction the ends of the wheel cylinder, which are the parts of the wheel cylinder bodies closest to the shoe webs, are insulated by the boots. Thus the wheel cylinder cannot function as a heat sink and heat transfer member wherein it receives the radiant heat from the shoes and transmits it to the backing plate. Instead the outer peripheries of the wheel cylinder boots receive extreme amounts of radiant heat under extreme brake conditions and tend to hold it without transferring it. This causes them to crack and fail prematurely. This also results in less net heat removal from the brake shoes in a given unit of time, this contributing to the tendency of the brakes to fade since they reach and retain higher shoe temperatures at an earlier point in time. By use of the structure embodying the invention however, the entire outer surface of the wheel cylinder body 28 is exposed to radiant heat from the shoe webs and, commonly being made of cast iron, readily absorbs this heat and transmits it to the backing plate so that the boots are protected for an additional period of time. This also tends to decrease the fade tendency of the brakes since the heat is not retained as long as before. Also the wheel cylinder boot does not have its relative section exposed to the extremely high radiant temperature, but to a lesser temperature found in the wheel cylinder body ends, therefore decreasing the likelihood of failure of the boot. In the particluar mechanism embodying the invention it is preferable to have all of the annular cylindrical outer peripheral section 58 of the boot shielded by the end of the wheel cylinder. Thus decreasing the radiant heat exposure of the boot to a minimum while permitting it to operate in the usual manner.

Another particularly important advantage of the invention is obtained after assembly of the wheel cylinder unit and during handling thereof. In prior construction units wherein the boot was cut over the cylinder end, the boot would be almost invariably cut. If the wheel cylinder was dropped from a height of approximately one foot to a solid surface such as a concrete floor, a work bench, or table, etc., this cut may be relatively minute in many instances but forms a weak spot where high stresses occur and becomes the direct cause of premature boot failure. By placing the boot inside the wheel cylinder end as contemplated in accordance with the invention, handling damage to the boot is eliminated. The wheel cylinder embodying the invention can be dropped from a height of five feet on most types of surfaces, including edges of machinery, benches, tables, etc., as well as concrete floors without damage to the unit. In particular no cuts occur on the boot. This is an extremely important advantage in the manufacture of wheel cylinder assemblies since such assemblies are handled by hand or machinery numerous times after being put together, not the least of which is the handling of replacement wheel cylinders by mechanics in all types of garages.

We claim:

1. A brake wheel cylinder assembly comprising, a housing having a cylinder bore provided therein, a piston operable in said bore and forming therewith fluid pressure chamber, one end of said housing adjacent said cylinder having a cylindrical recess formed therein of larger diameter than said cylinder bore whereby a shoulder is provided, the annular inner surface of said recess having a predetermined controlled micro finish of greater roughness than said cylinder bore, a link pin in engagement with said piston and extending through and beyond said cylinder for actuation of a brake shoe, and an annular wheel cylinder boot received about said link pin in sealing engagement therewith and having a cylindrical outer periphery inserted in said recess and in cylindrical surface engagement with the surface thereof whereby said boot is micro-mechanically retained and the end of said wheel cylinder is radially outward of the cylindrical outer periphery of said wheel cylinder boot.

2. A wheel cylinder assembly having a recessed cylindrical end with the inner surface thereof having a controlled micro finish within a predetermined roughness range, a flexible wheel cylinder boot having an annular inner seal section for sealing engagement with a link pin and an annular cylindrical outer seal section extending axially parallel to said wheel cylinder and received within said recess whereby the outer cylindrical surface of said outer seal section engages the controlled roughness surface of said recess by a micro mechanical lock created by material flow of said wheel cylinder boot to conform with the controlled rough surface, the micro-mechanical lock providing the means holding said boot in said cylindrical end.

3. Mechanism for increasing radiant heat dissipation and providing micro-mechanical locking boot retaining means in a wheel brake assembly having a brake drum and a backing plate with brake shoe means movably mounted thereon and providing a radiant heat source when actuated into braking engagement with said drum, said mechanism comprising a wheel cylinder assembly adapted to be secured to said backing plate in heat transmitting relation and having a cylinder and piston and link pin means for actuating said brake shoe means and wheel cylinder boot means received internally of said cylinder in sealing and micro-mechanical locking relation therewith and in sealing relation with said link pin means whereby the entire outer surface of said cylinder is in heat radiating relation to said shoe means to effectively receive radiant heat therefrom for primary heat transmittal to said backing plate and secondary heat transmitted to said boot means to increase said micro-mechanical locking relation and to protect said boot means from receiving radiant heat from said shoe means by shielding a part of said boot means therefrom.

4. A wheel cylinder assembly comprising a body having a cylinder bore opening through at least one end thereof with said bore having a first section and a second section, the wall of said first bore section having a micro finish of predetermined controlled quality on the order of 15 micro-inches R.M.S. and the wall of said second bore section having a rougher micro finish and adjacent the open bore end with no parts of the wall of said second bore section having a radius less than the radius of any part of the wall of said first bore section, a piston movably received in said first bore end working in said first bore section, and a rubber-like boot received in said bore end having an outer cylindrical section in cylindrical surface engagement with the wall of said second bore section, said boot outer cylindrical section having boot material flowed radially outward in complementary relation to the micro finish surface of the wall of the second bore section and cooperating therewith to establish a mechanical lock between said boot and said second bore section.

5. A fluid pressure servomotor comprising a cylindrical body having an inner cylindrical first wall with a micro finish wall surface and defining a pressure chamber cylinder and a power wall movable in said body, a cylindrical opening at least one end of said body through which said power wall may be removed and replaced, said body further having an inner cylindrical second wall with a predetermined controlled micro finish wall surface rougher than the micro finish of the first body wall with the minimum radius of any part of the second wall surface being greater than the maximum radius of any part of the first wall surface, and a flexible seal having a cylindrical outer surface engaging said second wall surface in mechanical micro-interlocking relation.

6. The servomotor of claim 5, said seal having means urging the cylindrical outer surface thereof radially outward thereby enhancing the micro-interlocking relation between the seal and the second wall surface.

7. The servomotor of claim 6, said cylindrical body having a shoulder at the juncture of said first and second walls and receiving the inner end of said flexible seal thereagainst.

8. A pressure actuated cylinder and piston assembly having a body formed with a cylinder with at least one open end, said cylinder being defined by a wall having a piston-receiving micro finish inner wall section and a seal-receiving outer wall section adjacent and extending to the cylinder open end having a micro finish substantially rougher than the inner wall section and a radius greater than the radius of the inner wall section, the cylinder body at the outer wall section having a thickness less than the wall thickness of the body at the inner wall section, a piston operating in said cylinder and forming a movable pressure chamber wall, force-transmitting means in operative association with said piston and extending axially outwardly of said cylinder, and annular seal means having an inner annulus sealing about said force-transmitting means and a cylindrically formed outer annulus having an inner radius at least as great as the radius of said inner wall section and an outer cylindrical surface the radius of which is substantially equal to the radius of said outer wall section, said outer cylindrical surface of said seal means outer annulus being in micro surface interlocking engagement with said outer wall section.

References Cited by the Examiner

UNITED STATES PATENTS

| | | | |
|---|---|---|---|
| 3,003,973 | 6/35 | Oliver | 60—54.6 |
| 2,120,922 | 6/38 | Rasmussen | 60—54.6 X |
| 2,354,831 | 2/44 | Rike | 74—18.2 |
| 2,442,640 | 6/48 | Dunn | 29—451 |
| 2,544,541 | 3/51 | McCarthy et al. | 74—18.2 |
| 2,924,008 | 2/60 | Haushalter | 29—451 |
| 2,938,349 | 5/60 | Britton | 60—54.6 |
| 3,043,338 | 7/62 | Hanson | 74—18.2 X |

EUGENE G. BOTZ, *Primary Examiner.*

ARTHUR L. LA POINT, DUANE A. REGER,
*Examiners.*